(12) United States Patent
Kim et al.

(10) Patent No.: US 8,164,698 B2
(45) Date of Patent: Apr. 24, 2012

(54) LIQUID CRYSTAL DISPLAY PANEL AND METHOD OF MANUFACTURING THE SAME

(75) Inventors: Jong-Seong Kim, Pohang-si (KR); Seong-Jun Lee, Seoul (KR); Woo-Jae Lee, Yongin-si (KR); Saranneerja, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 438 days.

(21) Appl. No.: 12/196,122

(22) Filed: Aug. 21, 2008

(65) Prior Publication Data

US 2009/0051842 A1 Feb. 26, 2009

(30) Foreign Application Priority Data

Aug. 24, 2007 (KR) .................. 10-2007-0085341

(51) Int. Cl.
*G02F 1/1333* (2006.01)
(52) U.S. Cl. .......................... 349/40; 349/122
(58) Field of Classification Search .............. 349/40, 349/122, 137–138, 158–159
See application file for complete search history.

(56) References Cited

U.S. PATENT DOCUMENTS

| 6,760,086 B2 * | 7/2004 | Hattori et al. ............. 349/122 |
| 7,413,766 B2 * | 8/2008 | Satake et al. ............. 427/162 |
| 2006/0119762 A1 * | 6/2006 | Haba ............................. 349/61 |
| 2006/0274047 A1 | 12/2006 | Spath | |

FOREIGN PATENT DOCUMENTS

| JP | 2007-122057 | 10/2007 |
| KR | 2000-0030096 | 6/2000 |

OTHER PUBLICATIONS

English Abstract, Publication No. JP 2007-122057.
English Abstract, Publication No. KR 2000-0030096.

* cited by examiner

*Primary Examiner* — Dung T. Nguyen
(74) *Attorney, Agent, or Firm* — Innovation Counsel LLP (57) ABSTRACT

Disclosed is a liquid crystal display panel which includes a first substrate, a thin film transistor array comprising at least one thin film transistor formed on a first surface of the first substrate, and a second substrate having a first surface facing the first substrate, the second substrate including an antistatic layer on a surface opposite the first surface of the second substrate. Liquid crystal molecules are positioned between the first surface of the first substrate and the first surface of the second substrate, wherein the antistatic layer includes conductive nanowire.

11 Claims, 13 Drawing Sheets

LIQUID CRYSTAL DISPLAY PANEL AND METHOD OF MANUFACTURING THE SAME

CROSS-REFERENCE TO RELATED APPLICATION

This application claims priority under 35 U.S.C. §119 to Korean Patent Application No. 10-2007-0085341, filed on Aug. 24, 2007 in the Korean Intellectual Property Office (KIPO), the contents of which are incorporated herein by reference in their entirety.

BACKGROUND

This disclosure relates to liquid crystal display ("LCD") devices, and more particularly, to a plane-to-line switching mode touch screen panel LCD.

With the development of the modern information age, LCD devices have received increased attention for use as display devices. Although LCD display devices are typically somewhat more expensive than cathode ray tube display devices, their application range has been greatly extended due to their recognized advantages of being light in weight, slim in size, and low in power consumption. An LCD device displays images by causing liquid crystal cells which are arranged in a matrix shape in a liquid crystal panel to adjust their light transmittance in response to a video signal.

An LCD device may be classified into an in-plane switching ("IPS") mode LCD device or a plane-to-line switching ("PLS") mode LCD device according to the arrangement of liquid crystal molecules.

In the PLS mode LCD device, a common electrode and a pixel electrode with an insulating layer disposed therebetween form a fringe electric field in each pixel region and thus liquid crystal molecules disposed between an upper substrate and a lower substrate operate in each pixel region. The PLS mode, however, may be subject to static electricity because electrodes are formed on only one substrate, generating an electric field.

An LCD device can include a touch display panel through which data is input by pressing a display screen by means of a pen or a finger. However, as a result, the touch display panel can also be easily subject to static electricity.

To suppress the occurrence of static electricity, an antistatic layer made of indium-tin-oxide ("ITO") is deposited at the back side of an opposite substrate of the LCD panel using the PLS mode and touch screen panel technologies. However, since the ITO used for the antistatic layer is different in deposition conditions from the ITO used for the pixel electrode and the common electrode, it is necessary to additionally manufacture the antistatic layer, which thereby increases costs. Furthermore, because the surface of the ITO used for the antistatic layer is exposed without a passivation layer, scratches may occur and thus defects may be increased.

BRIEF SUMMARY

In accordance with the exemplary embodiments disclosed herein, an LCD panel and methods of manufacturing the same will save manufacturing costs by means of an antistatic layer using a conductive nanowire, where the antistatic layer is protected from scratching by forming an overcoat layer and a passivation film on the antistatic layer.

In one exemplary embodiment, a liquid crystal display panel includes: a first substrate; a thin film transistor array comprising at least one thin film transistor formed on a first surface of the first substrate; a second substrate having a first surface facing the first substrate, the second substrate including an antistatic layer on a surface opposite the first surface of the second substrate; and liquid crystal molecules positioned between the first surface of the first substrate and the first surface of the second substrate, wherein the antistatic layer includes conductive nanowire.

The conductive nanowire may be formed of an electrically conductive material.

The electrically conductive material may include at least one of gold (Au), silver (Ag), platinum (Pt), palladium (Pd), nickel (Ni), copper (Cu), carbon (C), aluminum (Al), tin (Sn), and titanium (Ti), or a combination of two or more of these materials.

The liquid crystal display panel may further include an overcoat layer formed on the antistatic layer.

The overcoat layer may be formed with a thickness of about 1 nm to about 10 μm.

The overcoat layer may be formed of a transparent synthetic resin.

The antistatic layer may further include a polymer material.

The polymer material may be an aqueous polymer material.

The aqueous polymer material may include at least one of poly(3,4-etylenedioxythiophene), water-dispersive urethane and water-dispersive polyurethane.

The liquid crystal display panel may further include a protective film on the antistatic layer.

The liquid crystal display panel may further include an adhesion layer interposed between the antistatic layer and the protective film.

The liquid crystal display panel may further include a touch sensor formed between the first substrate and the second substrate.

In another exemplary embodiment, a method of manufacturing a liquid crystal display panel includes: providing a first substrate; providing a thin film transistor array comprising at least one thin film transistor formed on a first surface of the first substrate; providing a second substrate having a first surface facing the first substrate; assembling the first substrate and the second substrate and injecting liquid crystal molecules between the first surface of the first substrate and the first surface of the second substrate; and forming an antistatic layer comprising conductive nanowire at a surface opposite the first surface of the second substrate.

The step of forming the antistatic layer may include forming the antistatic layer by wet-coating solution including the conductive nanowire.

The conductive nanowire may include an electrically conductive material. The electrically conductive material may include at least one of gold (Au), silver (Ag), platinum (Pt), palladium (Pd), nickel (Ni), copper (Cu), carbon (C), aluminum (Al), tin (Sn), and titanium (Ti), or a combination of two or more of these materials.

The solution including the conductive nanowire may further include a polymer material.

The method of manufacturing the liquid crystal display may further include forming an overcoat layer on the antistatic layer.

The step of forming the overcoat layer may include wet-coating a synthetic resin on the antistatic layer; and hardening the synthetic resin coated on the antistatic layer.

The method of manufacturing the liquid crystal display may further include attaching a protective film on the antistatic layer.

The method of manufacturing the liquid crystal display may further include forming a touch sensor between the first substrate and the second substrate.

A better understanding of the above and many other features and advantages of this invention may be obtained from a consideration of the detailed description thereof below, particularly if such consideration is made in conjunction with the several views of the appended drawings, wherein like elements are referred to by like reference numerals throughout.

DETAILED DESCRIPTION

Figure 1:
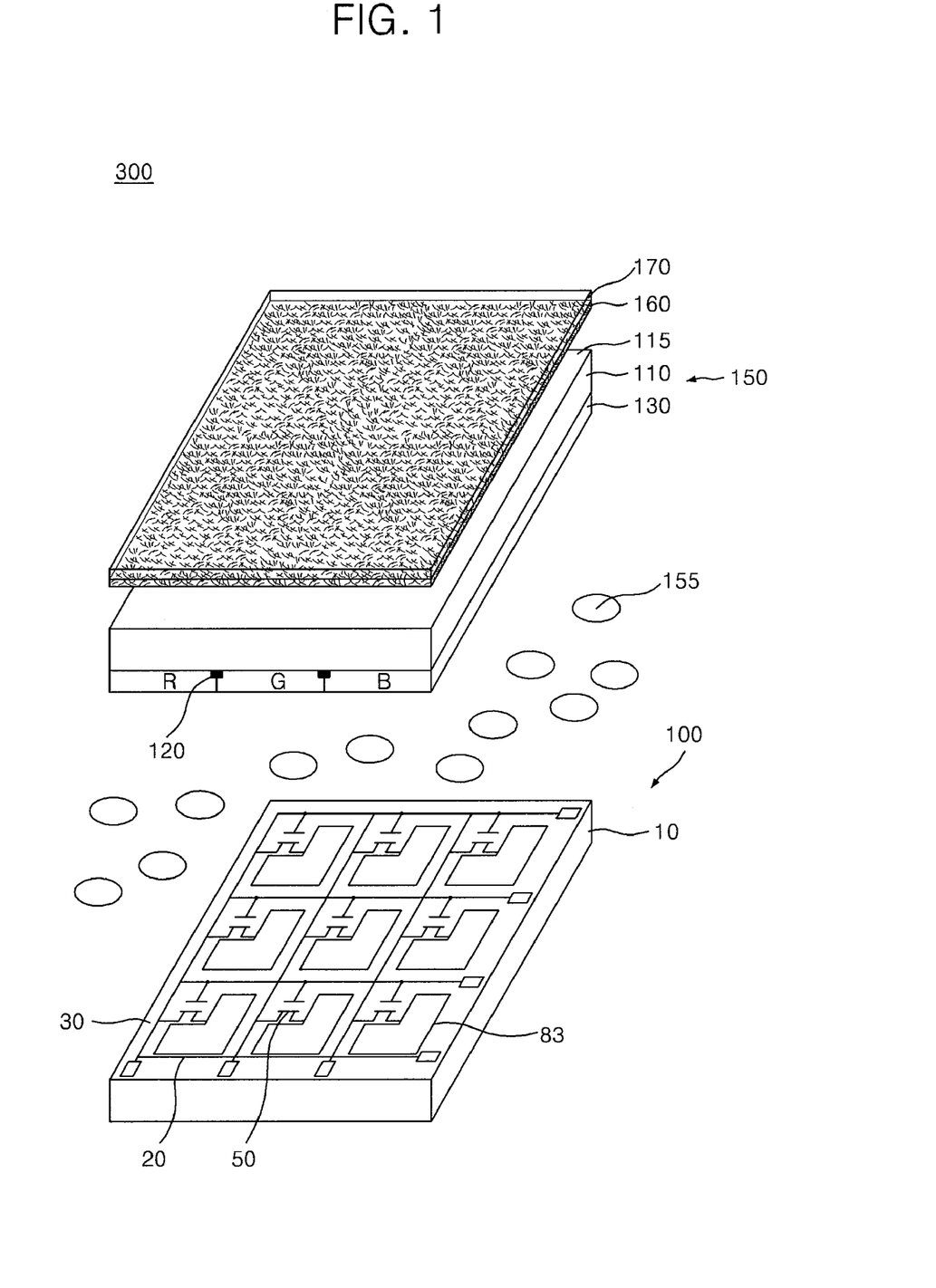
FIG. 1 is a perspective view of a first exemplary embodiment of an LCD panel according to the present invention.
Figure 2:
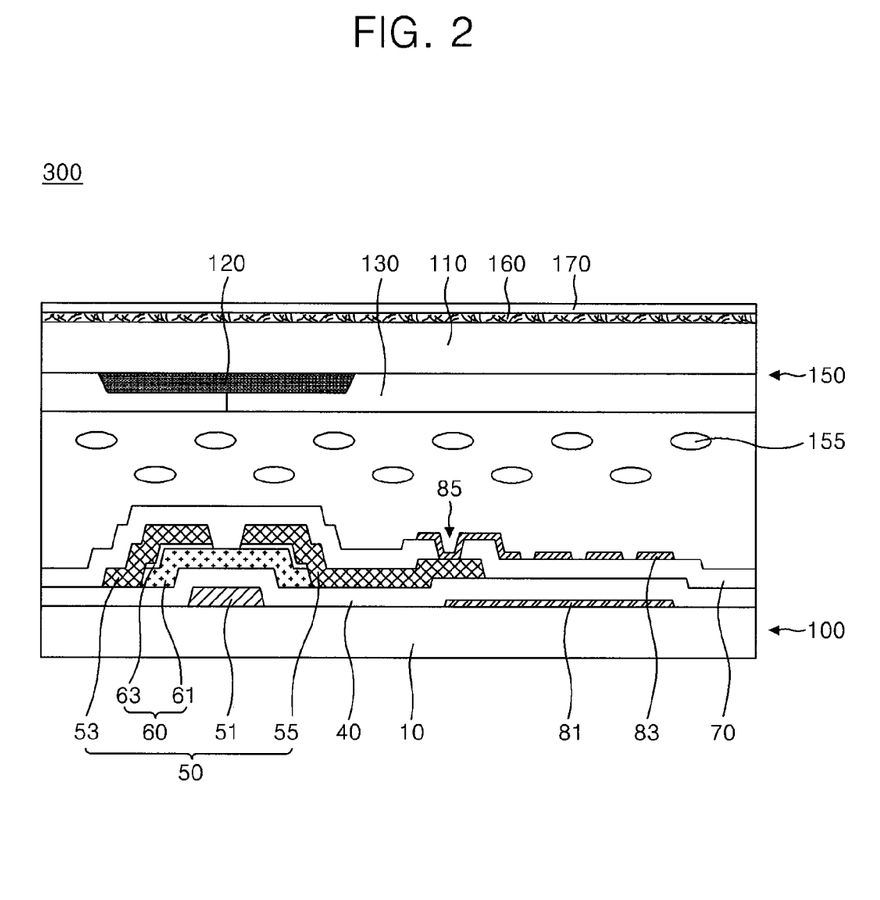
FIG. 2 is a cross-sectional view of the LCD panel shown in FIG. 1.

FIG. 1 is a perspective view of a first exemplary embodiment of an LCD panel according to the present invention, and FIG. 2 is a cross-sectional view of the LCD panel shown in FIG. 1.

Referring to FIGS. 1 and 2, an LCD panel 300 includes a thin film transistor ("TFT") substrate 100, an opposite substrate 150 arranged opposite to the TFT substrate 100, and liquid crystal molecules 155.

The TFT substrate 100 includes a gate line 20, a data line 30, a gate insulating layer 40, a TFT 50, a common electrode 81, a pixel electrode 83, and a passivation layer 70.

The gate line 20 receives a scan signal from a gate driver (not shown). The gate line 20 is formed on a first substrate 10 and formed in a single layer structure including molybdenum (Mo), chrome (Cr), silver (Ag) or tungsten (W) or in a multilayer structure using theses metals.

The data line 30 receives a pixel voltage signal from a data driver (not shown). The data line 30 crosses the gate line 20 with the gate insulating layer 40 disposed therebetween.

The gate insulating layer 40 is formed between the gate line 20 and the data line 30 and insulates a gate metal pattern including the gate line 20 from a data metal pattern including the data line 30.

The TFT 50 causes the pixel voltage signal of the data line 30 to be charged in the pixel electrode 83 in response to the scan signal of the gate line 20. The TFT 50 includes a gate electrode connected to the gate line 20, a source electrode 53 connected to the data line 30, and a drain electrode 55 connected to the pixel electrode 83.

The TFT 50 includes a semiconductor pattern 60 forming a channel between the source electrode 53 and the drain electrode 55. The semiconductor pattern 60 includes an active layer 61 and an ohmic contact layer 63. The active layer 61 overlaps the gate electrode 51 with the gate insulating layer 40 disposed therebetween. The ohmic contact layer 63 is formed on the active layer 61 and forms an ohmic contact between the data line 30 and the source electrode 53, and between the data line 30 and the drain electrode 55.

The common electrode 81 supplies a reference voltage for driving the liquid crystal molecules 155, i.e., a common voltage to the liquid crystal molecules 155. The common electrode 81 may be formed of a transparent electrode on the first substrate 10.

The pixel electrode 83 is connected to the drain electrode 55 of the TFT 50 and overlaps the common electrode 81 with the gate insulating layer 40 and the passivation layer 70 disposed therebetween. A plurality of slits is formed on the pixel electrode 83 to form the fringe electric field with the common electrode 81. The pixel electrode 83 forms the fringe electric field with the common electrode 81 upon receipt of the pixel voltage signal through the TFT 50, thereby twisting the liquid crystal molecules 155 arranged in a horizontal direction by dielectric anisotropy.

The passivation layer 70 is formed on the data line 30 and the TFT 50 to protect the data line 30 and the TFT 50. The passivation layer 70 includes a contact hole 85 through which the pixel electrode 83 is connected to the drain electrode 55.

The opposite substrate 150 includes a black matrix 120, a color filter 130, an antistatic layer 160, and an overcoat layer 170. The black matrix 120 is formed on a second substrate 110 in a matrix shape to divide a region where the color filter 130 is to be formed. The black matrix 120 overlaps the gate line 20, the data line 30, and the TFT 50 of the TFT substrate 100.

The color filter 130 is formed in a region divided by the black matrix 120. The color filter 130 includes red (R), green (G), and blue (B) color filters to express video images. The color filter 130 is formed in a stripe shape in which R, G and B color filters are arranged in a row.

The antistatic layer 160 is formed at a back side 115 of the second substrate 110, the second substrate 110 facing the TFT substrate 100. In an exemplary embodiment, the antistatic layer 160 is formed of a transparent conductive layer.

The overcoat layer 170 is formed on the antistatic layer 160.

The liquid crystal molecules 155 are formed of materials having dielectric anisotropy and refractive anisotropy. The liquid crystal molecules 155 are arranged in a horizontal direction by a horizontal electric field between the common electrode 81 and the pixel electrode 83 of the TFT substrate 100.

Hereinafter, the antistatic layer 160 and the overcoat layer 170 are described in detail with reference to FIGS. 3 and 4.

Figure 3:
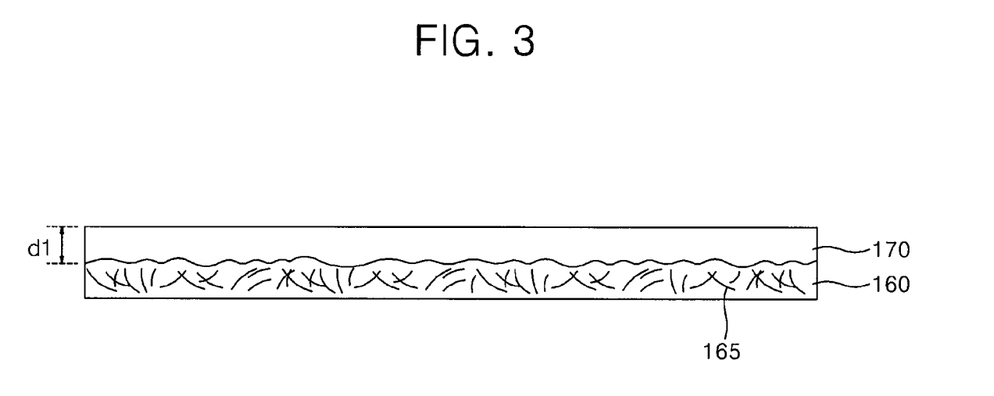
FIG. 3 is an enlarged view of the antistatic layer and the overcoat layer shown in FIG. 2.
Figure 4:
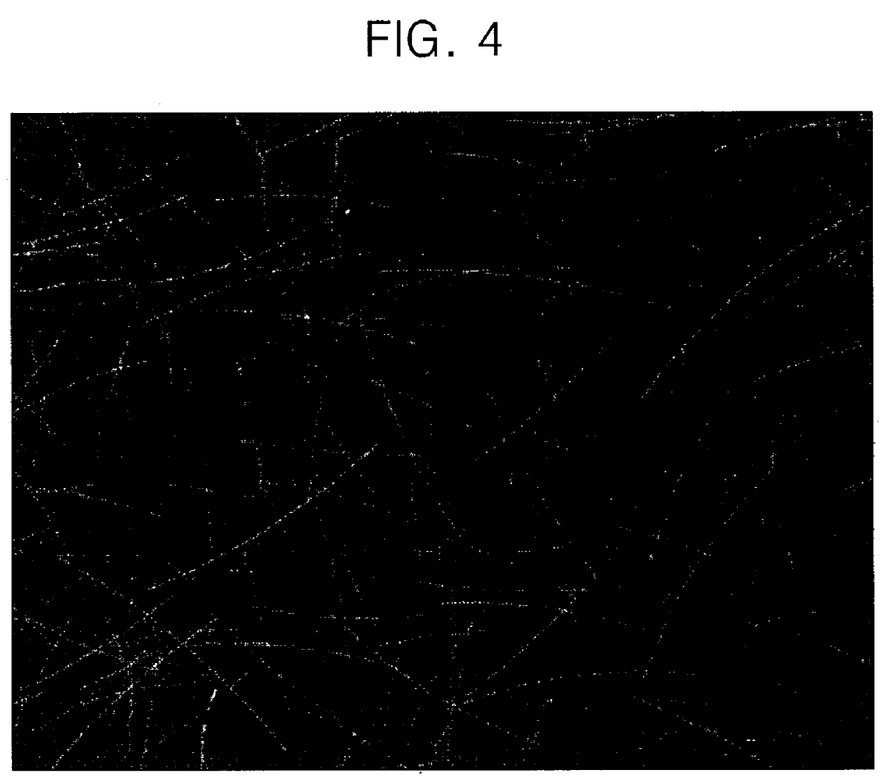
FIG. 4 is a scanning electron microscope (SEM) photograph of the antistatic layer shown in FIG. 3.

FIG. 3 is an enlarged diagram of the antistatic layer and the overcoat layer shown in FIG. 2, and FIG. 4 is a scanning electron microscope (SEM) photograph of the antistatic layer shown in FIG. 3.

Referring to FIG. 3, the antistatic layer 160 is formed by coating an aqueous solution including a conductive nanowire 165. The conductive nanowire 165 may be formed of an electrically conductive material. For example, the electrically conductive material may be one of gold (Au), silver (Ag), platinum (Pt), palladium (Pd), nickel (Ni), copper (Cu), carbon (C), aluminum (Al), tin (Sn), and titanium (Ti), or a combination of theses metals. In an exemplary embodiment, the electrically conductive material is formed of Ag. The conductive nanowire 165 may be formed to a diameter thickness of about 20 nm to about 40 nm and with a length of about 5 μm to about 10 μm as shown in FIG. 4.

In an exemplary embodiment, the surface resistivity of the antistatic layer 160 may be 500 Ω/sq or less. Because the surface resistivity of the antistatic layer 160 becomes less than the surface resistivity, 1 kΩ/sq, of an indium tin oxide (ITO) layer which has been conventionally used as an antistatic layer, the antistatic effect of the antistatic layer 160 is improved.

The overcoat layer 170 is formed on the antistatic layer 160. The overcoat layer 170 serves as a protective layer and planarizes the antistatic layer 160 having a rugged surface and also protects the antistatic layer 160 from scratching.

The overcoat layer 170 may be formed of a transparent synthetic resin. More specifically, the overcoat layer 170 may be formed of at least one of polymethylmethacrylate (PMMA), polyamide (PA), polyurethane resin (PUR), and epoxy resin.

In an exemplary embodiment, the overcoat layer 170 has a thickness d1 of about 1 nm to about 10 μm. When the thickness d1 of the overcoat layer 170 is less than about 1 nm, the overcoat layer 170 may not sufficiently cover the antistatic layer 160. When the thickness d1 of the overcoat layer 170 is greater than about 10 μm, the overcoat layer 170 covers the antistatic layer 160 but may cause the deformation of the second substrate 110 during thermal processing due to the very thick overcoat layer.

Figure 5:
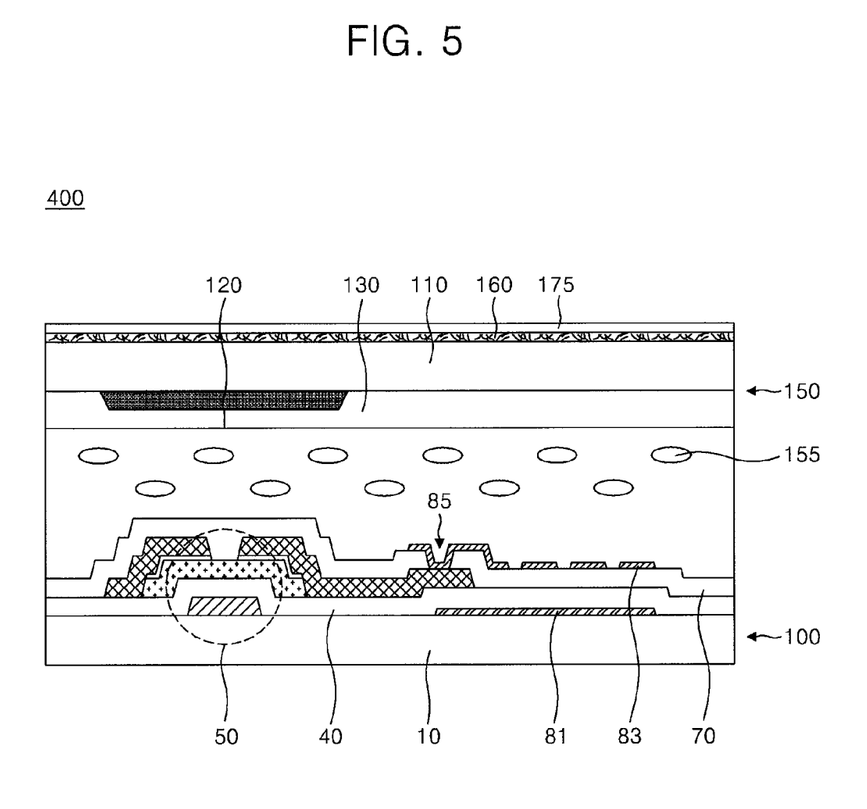
FIG. 5 is a cross-sectional view of a second exemplary embodiment of an LCD panel according to the present invention.

FIG. 5 is a cross-sectional view of a second exemplary embodiment of an LCD panel according to the present invention.

Referring to FIG. 5, an LCD panel 400 includes a TFT substrate 100, an opposite substrate 150 arranged opposite to the TFT substrate 100, and liquid crystal molecules (not shown).

The opposite substrate 150 includes a second substrate 110, a black matrix 120, a color filter 130, an antistatic layer 160, and a protective film 175.

The antistatic layer 160 is formed at the back of the second substrate 110 facing the TFT substrate 100 and the protective film 175 is arranged on the antistatic layer 160.

The black matrix 120 is formed on the second substrate 110 in a matrix shape to divide a region where the color filter 130 is to be formed.

The color filter 130 is formed in a region divided by the black matrix 120. The color filter 130 includes red (R), green (G), and blue (B) color filters to achieve video images.

The liquid crystal molecules 155 are arranged in a horizontal direction by a horizontal electric field between a common electrode 81 and a pixel electrode 83 of the TFT substrate 100.

The TFT substrate 100 includes a gate line 20 formed on a first substrate 10, a data line 30 crossing the gate line 20 with the gate insulating layer 40 disposed therebetween, and a TFT 50 connected to the gate line 20 and the data line 30. The TFT substrate 100 also includes a pixel electrode 83, and a common electrode 81 overlapping the pixel electrode 83 with the gate insulating layer 40 and the passivation layer 70 disposed therebetween.

Hereinafter, the antistatic layer 160 and the protective film 175 are described in detail with reference to FIG. 6.

Figure 6:
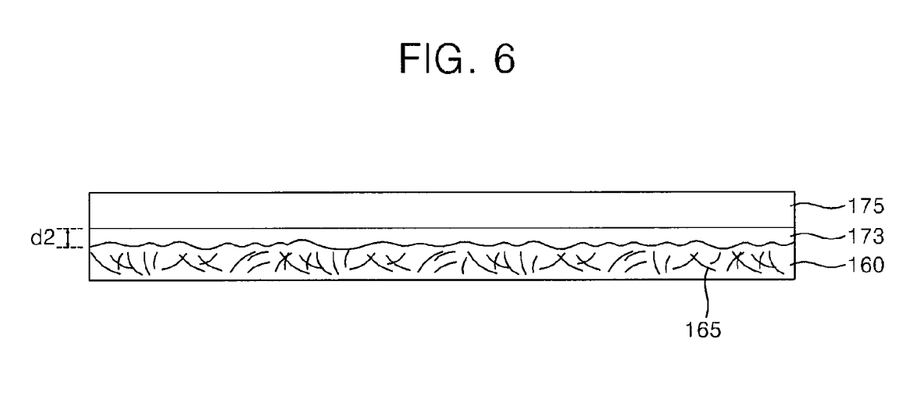
FIG. 6 is an enlarged view of the antistatic layer and the protective film shown in FIG. 5.

FIG. 6 is an enlarged diagram of the antistatic layer 160 and the protective film 175, as shown in FIG. 5.

Referring to FIG. 6, the antistatic layer 160 is formed of a conductive nanowire 165. The conductive nanowire 165 may be formed of an electrically conductive material. In an exemplary embodiment, the electrically conductive material is formed of Ag. The surface resistivity of the antistatic layer 160 may be 500 Ω/sq or less.

The protective film 175 is formed on the antistatic layer 160. The protective film 175 may be formed of a resin such as polyethylene terephthalate (PET), polyethylene naphthalate (PEN), polycarbonate (PC) or polyether sulfone (PES). The protective film 175 protects the antistatic layer 160 from scratching, thereby reducing a defect rate of the LCD panel 300.

An adhesion layer 173 may be formed under the protective film 175. The adhesion layer 173 planarizes the antistatic layer 160 having a rugged surface due to the conductive nanowire 165. In an exemplary embodiment, the adhesion layer 173 has a thickness d2 of 15 μm or more. When the thickness d2 of the overcoat layer 170 is less than 15 μm, the adhesion layer 173 may not planarize the antistatic layer 160 having a rugged surface.

Figure 7:
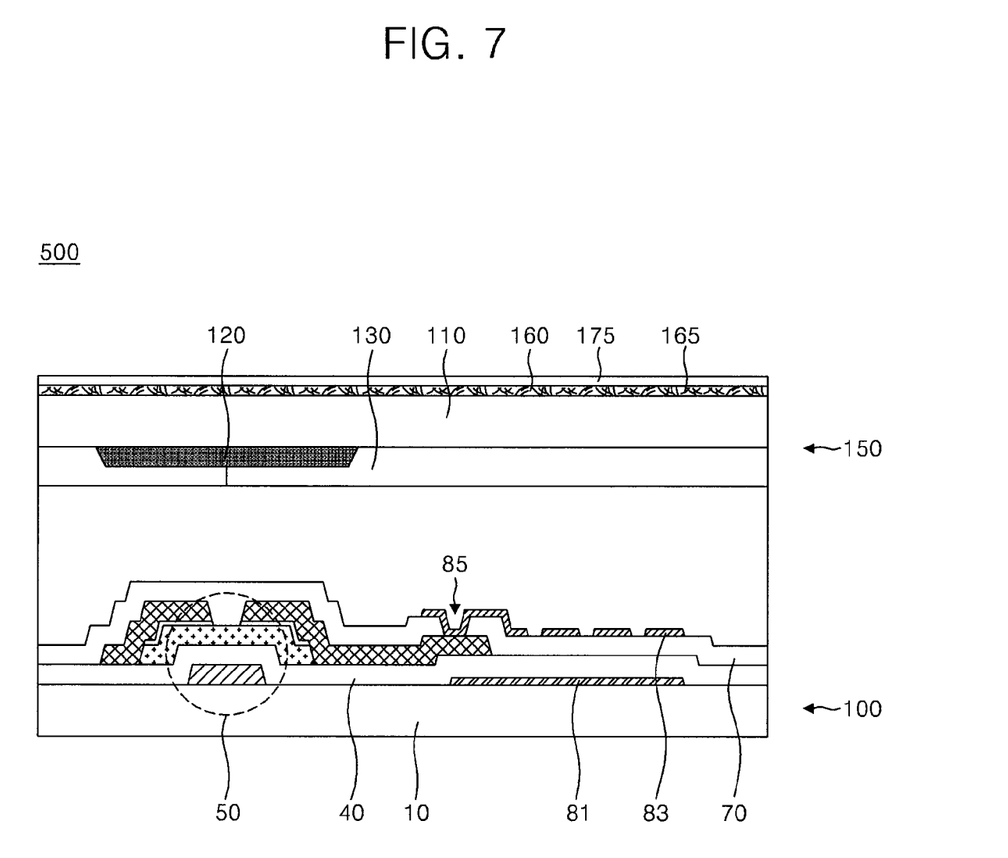
FIG. 7 is a cross-sectional view of a third exemplary embodiment of an LCD panel according to the present invention.

FIG. 7 is a cross-sectional view of a third exemplary embodiment of an LCD panel according to the present invention.

Referring to FIG. 7, an LCD panel 500 includes a TFT substrate 100, an opposite substrate 150 arranged opposite to the TFT substrate 100, and liquid crystal molecules (not shown).

The opposite substrate 150 includes a second substrate 110, a black matrix 120, a color filter 130, an antistatic layer 160, and a protective film 175.

The antistatic layer 160 is formed at the back of the second substrate 110 facing the TFT substrate 100 and the protective film 175 is arranged on the antistatic layer 160.

The antistatic layer 160 is formed of a conductive nanowire 165 and a polymer material. More specifically, the antistatic layer 160 is formed by adding an aqueous polymer material to an aqueous solution including a conductive nanowire 165. The aqueous polymer material may be at least one of poly(3, 4-etylenedioxythiophene) and water-dispersive emulsion. The water-dispersive emulsion includes water-dispersive urethane, water-dispersive polyurethane, and the like.

Because the antistatic layer 160 includes a polymer material that increases an adhesion force with the second substrate 110, the surface resistivity is lowered, thereby improving the antistatic processing effect of the antistatic layer 160. In an exemplary embodiment, the conductive nanowire 165 is formed of an electrically conductive material, for example, Ag.

The protective film 175 is formed on the antistatic layer 160 to protect the antistatic layer 160 from scratching. Since the protective film 175 has been explained with reference to the second exemplary embodiment of the present invention, a detailed description thereof will not be repeated. Instead of the protective film 175, the overcoat layer 170 described with reference to the first exemplary embodiment of the present invention may be formed on the antistatic layer 160.

The black matrix 120 is formed on a second substrate 110 to divide a region where the color filter 130 is to be formed.

The color filter 130 includes red (R), green (G) and blue (B) color filters to represent video images.

The liquid crystal molecules are arranged in a horizontal direction by a horizontal electric field between a common electrode 81 and a pixel electrode 83 of the TFT substrate 100.

The TFT substrate 100 includes a first substrate 10, a gate line 20, a gate insulating layer 40, a data line 30, a TFT 50, the common electrode 81, the pixel electrode 83, and a passivation layer 70. The TFT substrate 100 has the same configuration as that of FIGS. 1 and 2 and thus a detailed description thereof will be omitted.

Figure 8:
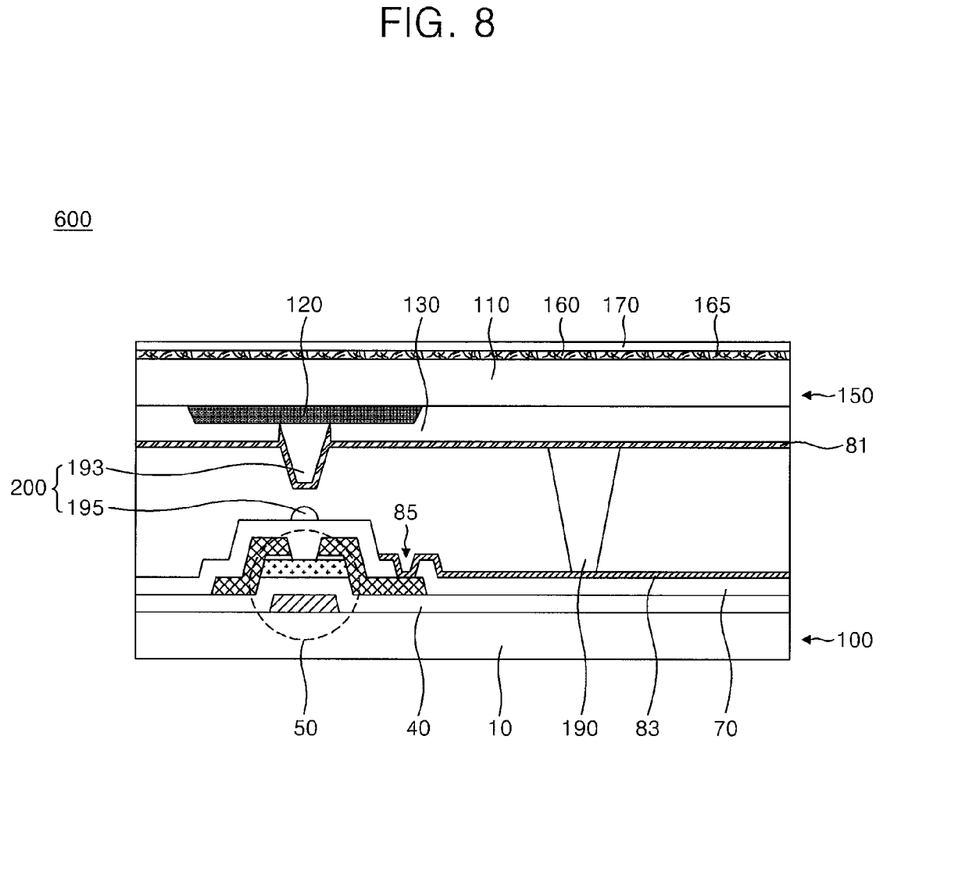
FIG. 8 is a cross-sectional view of a fourth exemplary embodiment of an LCD panel according to the present invention.

FIG. 8 is a cross-sectional view of a fourth exemplary embodiment of an LCD panel according to the present invention.

Referring to FIG. 8, an LCD panel 600 includes a TFT substrate 100, an opposite substrate 150 arranged opposite to the TFT substrate 100, liquid crystal molecules (not shown), a column spacer 190, and a touch sensor 200. The touch sensor 200 includes a touch spacer 193 and a sensor 195.

The opposite substrate 150 includes a second substrate 110, an antistatic layer 160, an overcoat layer 170, a touch spacer 193, a black matrix 120, a color filter 130, and a common electrode 81.

The antistatic layer 160 is formed at the back side of the second substrate 110 and formed of a conductive nanowire 165. The conductive nanowire 165 may be formed of an electrically conductive material. The overcoat layer 170 is formed on the antistatic layer 160 to protect the antistatic layer 160 from scratching.

Although the antistatic layer 160 including the conductive nanowire 165, along with the overcoat layer 170 have been described, the protective film 175 along with adhesion layer 173 described with reference to the second and third exemplary embodiments of the present invention may be formed on the antistatic layer 160 rather than on the overcoat layer 170.

The touch spacer 193 may be formed on the black matrix 120.

The black matrix 120 is formed on a second substrate 110 to divide a region where the color filter 130 is to be formed. The color filter 130 includes red (R), green (G), and blue (B) color filters to achieve video images.

The common electrode 81 is formed to cover the color filter 130 and the touch spacer 193. When pressure is applied from the exterior, the common electrode 81 covering the touch spacer 193 contacts the sensor 195 formed on the TFT substrate 100 so that external inputs can be detected.

The TFT substrate 100 includes a gate line 20 formed on a first substrate 10, a data line 30 overlapping the gate line 20 with a gate insulating layer 40 disposed therebetween, and a TFT 50 overlapping the gate line 20 and the data line 30. The TFT substrate 100 also includes a pixel electrode 83 connected to the TFT 50.

The TFT substrate 100 overlaps the TFT 50 and includes the sensor 195 formed on a passivation layer 70. The sensor 195 faces the touch spacer 193 of the opposite substrate 150 and is spaced apart from the touch spacer 193 until pressure is applied.

The liquid crystal molecules are formed of materials having dielectric anisotropy and refractive anisotropy. The liquid crystal molecules are formed between the opposite substrate 150 and the TFT substrate 100.

The column spacer 190 is formed between the TFT substrate 100 and the opposite substrate 150. The column spacer 190 separates the TFT substrate 100 from the opposite substrate 150 until pressure is applied from the exterior.

Figure 9:
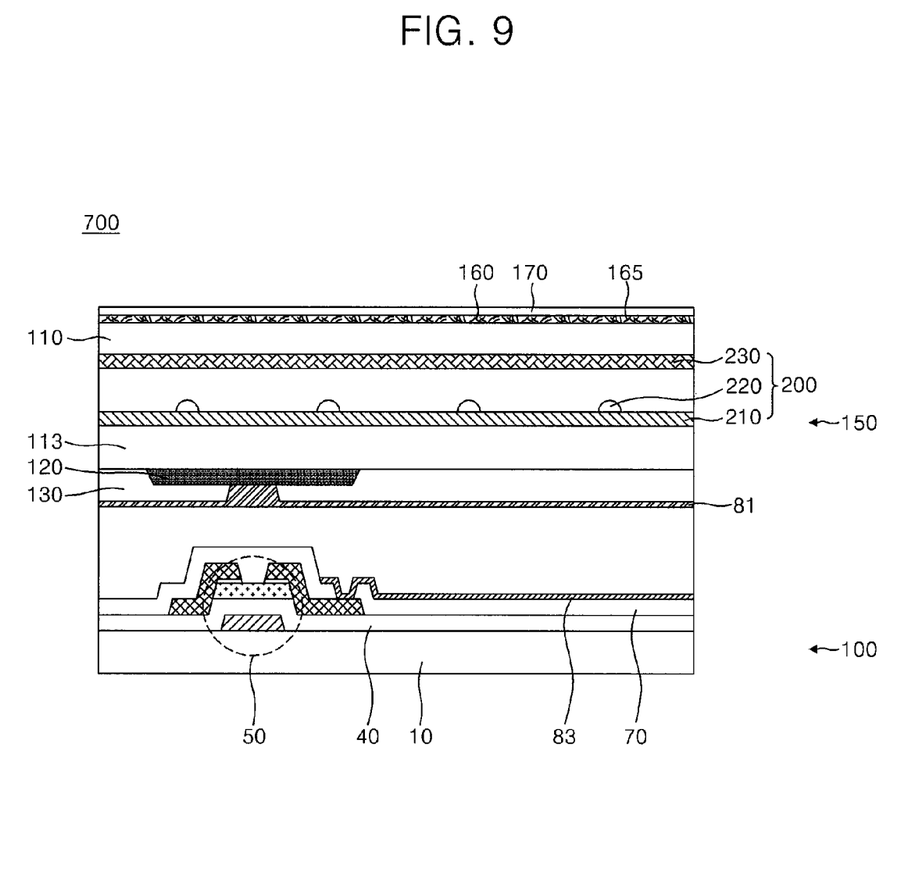
FIG. 9 is a cross-sectional view of a fifth exemplary embodiment of an LCD panel according to the present invention.

FIG. 9 is a cross-sectional view of a fifth exemplary embodiment of an LCD panel according to the present invention.

Referring to FIG. 9, an LCD panel 700 includes a TFT substrate 100, an opposite substrate 150 arranged opposite to the TFT substrate 100, and liquid crystal molecules (not shown).

The opposite substrate 150 includes a second substrate 110, an auxiliary substrate 113, an antistatic layer 160, an overcoat layer 170, a black matrix 120, a color filter 130, a common electrode 81, and a touch sensor 200.

The antistatic layer 160 is formed at the back side of the second substrate 110 facing the TFT substrate 100. The antistatic layer 160 is formed of a conductive nanowire 165.

The overcoat layer 170 is formed on the antistatic layer 160. The overcoat layer 170 planarizes the antistatic layer 160 having a rugged surface.

The antistatic layer 160 and the overcoat layer 170 have the same configuration as the antistatic layer 160 and the overcoat layer 170 described in the first exemplary embodiment of the present invention and thus a detailed description thereof will be omitted.

Although the antistatic layer 160 including the conductive nanowire 165 and the overcoat layer 170 have been described, the protective film 175 along with the adhesion layer 173 described in the second and third exemplary embodiments of the present invention may be formed on the antistatic layer 160.

The touch sensor 200 includes a touch spacer 220, a first sensor electrode 210, and a second sensor electrode 230.

The first and second sensor electrodes 210 and 230 face the auxiliary substrate 113 and the second substrate 110, respectively. When pressure is applied from the exterior, the first and second sensor electrodes 210 and 230 contact each other so that external inputs can be sensed.

The touch spacer 220 is formed on the first sensor electrode 210. Alternatively, the touch sensor 220 may be formed on the second sensor electrode 230. The touch spacer 220 maintains a prescribed distance between the first and second sensor electrodes 210 and 230 when pressure is applied from the exterior.

The black matrix 120 is formed on the auxiliary substrate 113 and divides a region where the color filter 130 is to be formed. The color filter 130 represents a video image. The common electrode 81 is formed to cover the black matrix 120 and the color filter 130.

The TFT substrate 100 includes a gate line 20 formed on a first substrate 10, a data line 30 overlapping the gate line 20 with a gate insulating layer 40 disposed therebetween, and a TFT 50 overlapping the gate line 20 and the data line 30. The TFT substrate 100 also includes a pixel electrode 83 connected to the TFT 50 with a passivation layer 70 disposed therebetween.

The liquid crystal molecules are formed between the opposite substrate 150 and the TFT substrate 100.

In the first to fifth exemplary embodiments of the present invention, the color filter has been described as being formed on the opposite substrate but the color filter may be formed on the TFT substrate.

A process of manufacturing an LCD panel will be described hereinafter with reference to FIGS. 10A to 13.

Figure 10A:
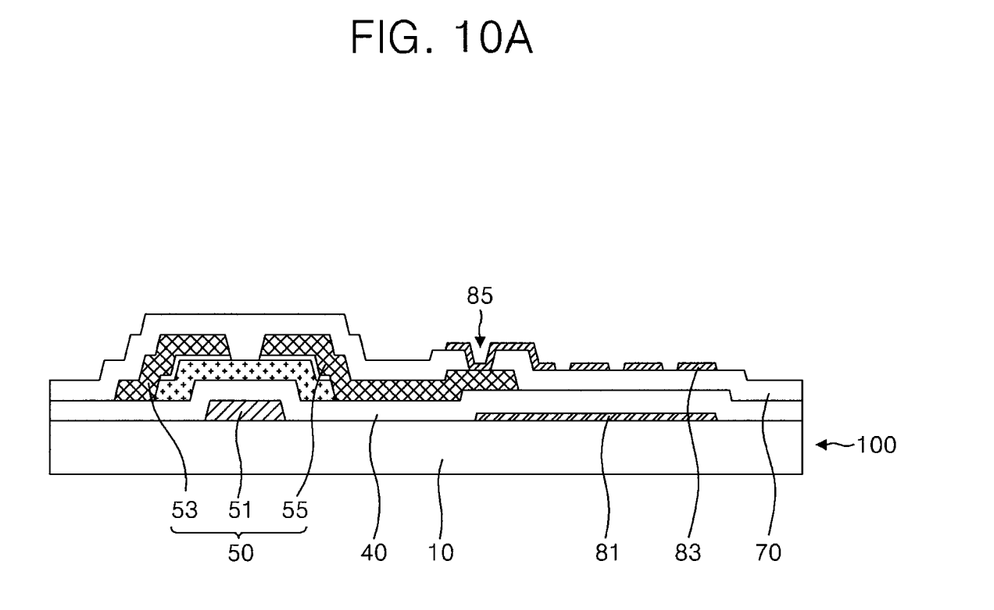
FIGS. 10A, 10B, and 10C are cross-sectional views of an exemplary embodiment of a process of assembling a TFT substrate and an opposite substrate according to the present invention.
Figure 10B:
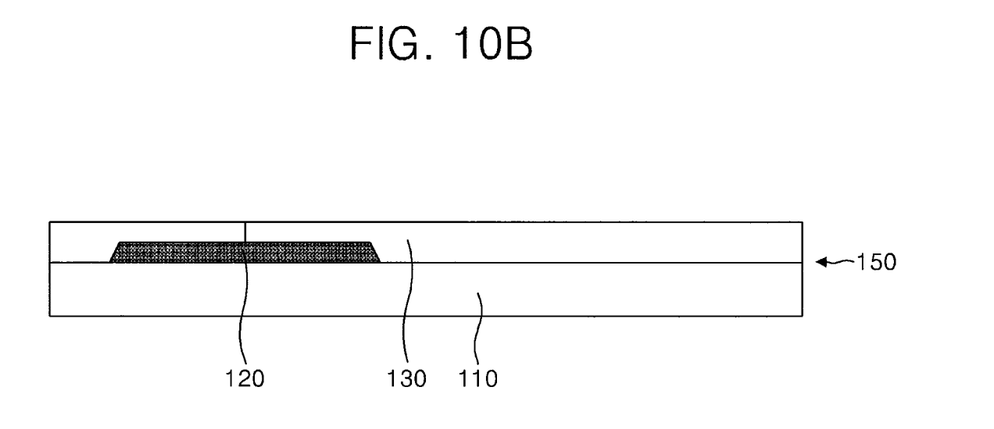
Figure 10C:
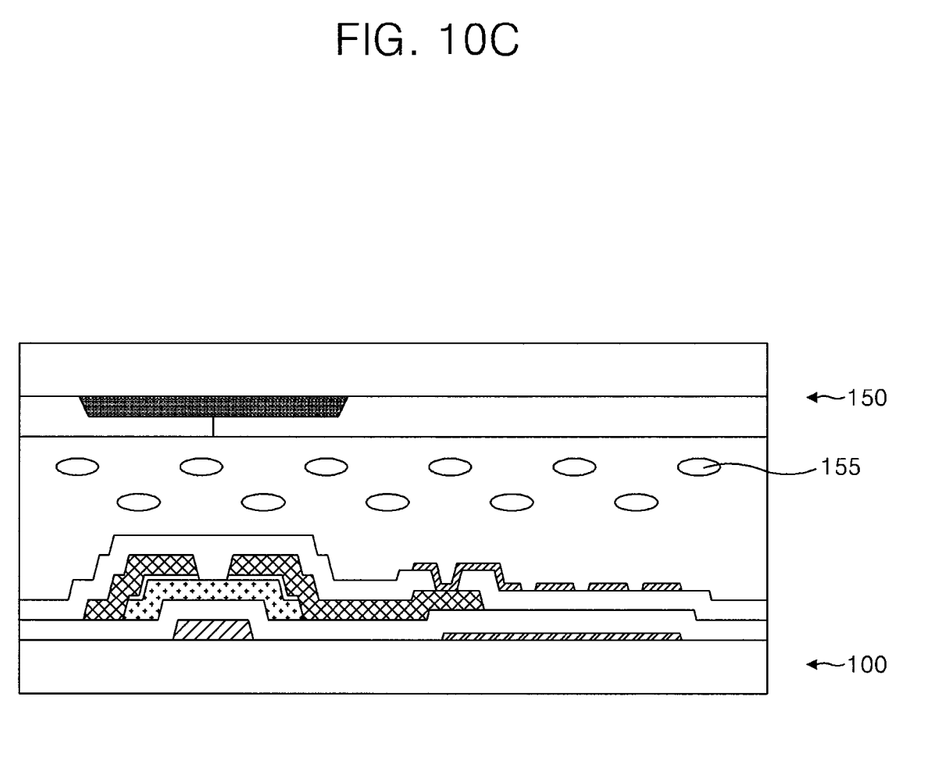

FIGS. 10A, 10B, and 10C are cross-sectional views of an exemplary embodiment of a process of assembling a TFT substrate and an opposite substrate in the process of manufacturing the LCD panel according to the present invention.

Referring to FIG. 10A, a TFT substrate 100 including a TFT array formed on a first substrate 10 is prepared. A gate metal pattern including a gate line 20 and the gate electrode 51 is formed on the first substrate 10 and a common electrode 81 is formed on the first substrate 10. A gate insulating layer 40 is formed on the gate metal pattern and the common electrode 81, and a data metal pattern is formed including a data line 30, a source electrode 53, and a drain electrode 55. Next, passivation layer 70 including a contact hole 85 is formed on the data metal pattern and a pixel electrode 83 is formed on the passivation layer 70. Although not shown in the drawing, a touch sensor may be formed on the TFT substrate 100.

Referring to FIG. 10B, an opposite substrate 150 is prepared including a color filter array formed on a second substrate 110. A black matrix 120 is formed on the second substrate 110. A color filter 130 is formed in a region divided by the black matrix 120.

Although not shown in the drawing, a touch sensor may be formed at the back side of the second substrate 110 on which the color filter array is formed.

Referring to FIG. 10C, the TFT substrate 100 and the opposite substrate 150 are assembled together and liquid crystal molecules 155 are injected between the TFT substrate 100 and the opposite substrate 150.

Figure 11A:
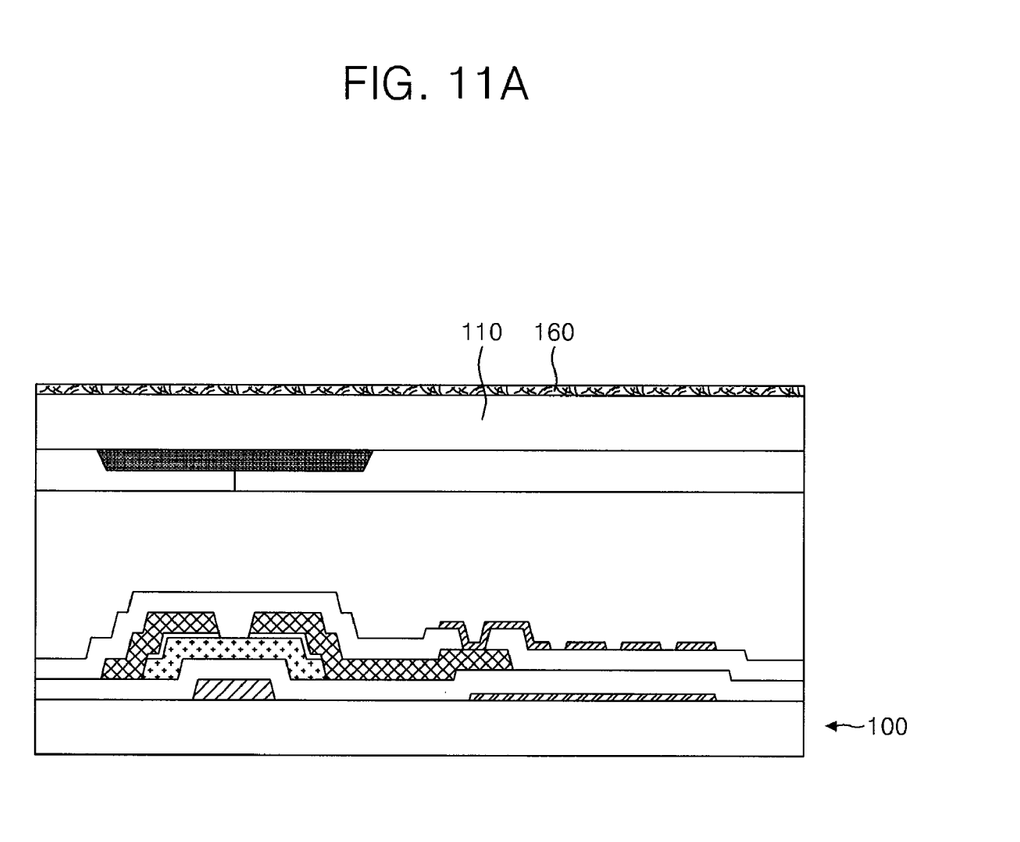
FIGS. 11A and 11B are cross-sectional views of an exemplary embodiment of a process of manufacturing an antistatic layer and an overcoat layer according to the present invention.
Figure 11B:
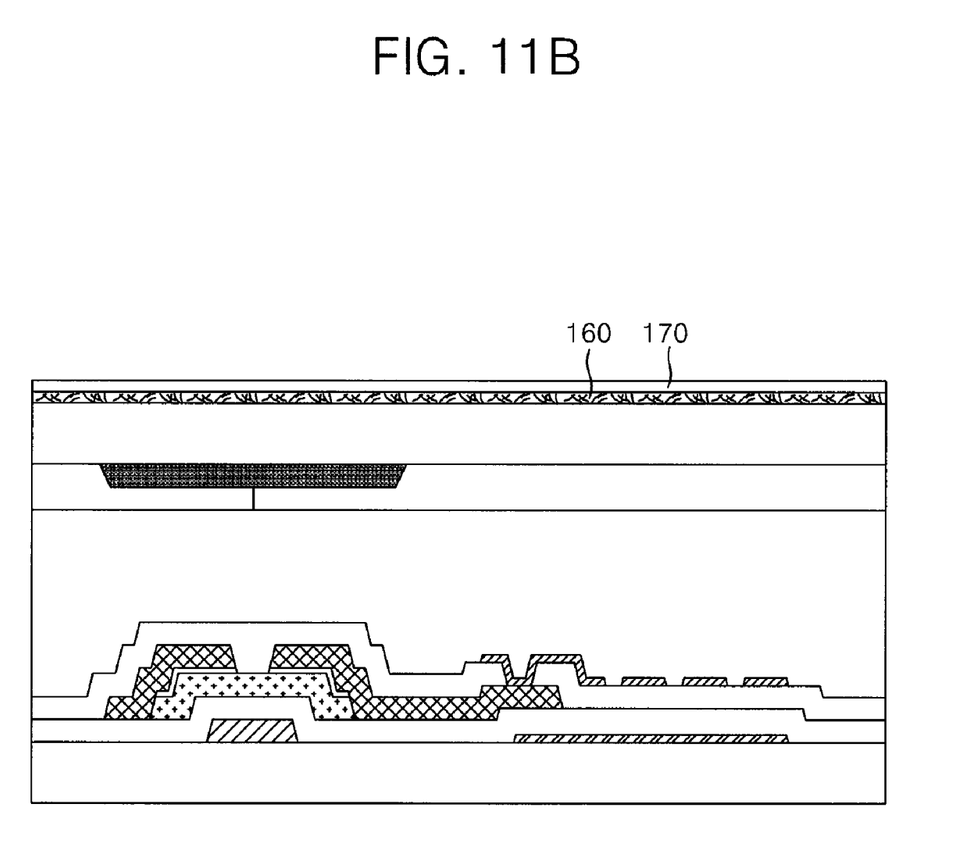

FIGS. 11A and 11B are cross-sectional views of an exemplary embodiment of a process of manufacturing an antistatic layer and an overcoat layer according to the present invention.

Referring to FIG. 11A, an antistatic layer 160 is formed at the back side of a second substrate 110. More specifically, an aqueous solution including a conductive nanowire 165 is coated by wet coating such as spin coating, bar coating or slit coating on the back side of the second substrate 110 facing the TFT substrate 100.

Referring to FIG. 11B, the overcoat layer 170 is formed on the antistatic layer 160. More specifically, a synthetic resin is coated by wet coating such as spin coating, bar coating or slit coating on the antistatic layer 160. Thereafter, the synthetic resin is hardened by using heat or ultraviolet rays. Then the antistatic layer 160 and the overcoat layer 170 are formed at the back side of the second substrate 110. Since an identical wet coating device is used for the antistatic layer 160 and the overcoat layer 170, manufacturing costs can be saved.

Figure 12:
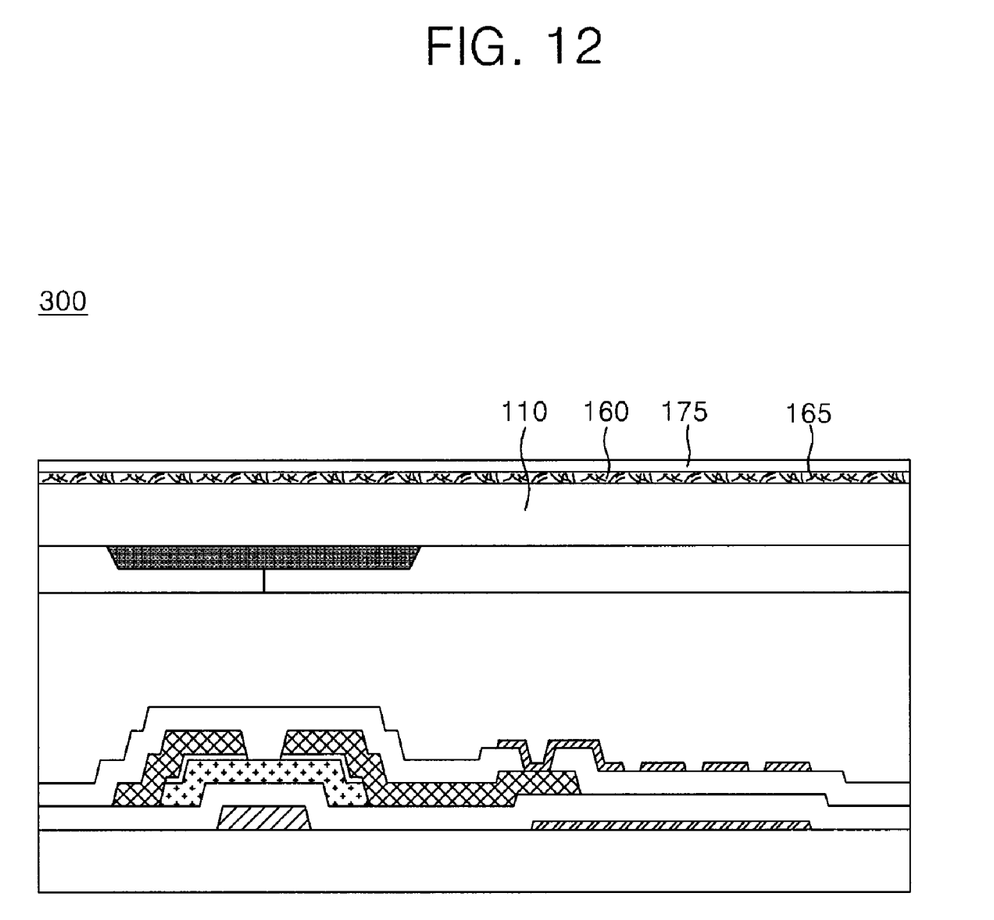
FIG. 12 is a cross-sectional view of another exemplary embodiment of a process of manufacturing the antistatic layer according to the present invention.

FIG. 12 is a cross-sectional view of another exemplary embodiment of a process of manufacturing an antistatic layer according to the present invention.

Referring to FIG. 12, an antistatic layer 160 and a protective film 175 are formed at the back side of the second substrate 110. The antistatic layer 160 is formed by coating an aqueous solution including a conductive nanowire 165 by wet coating at the back side of the second substrate 110. Thereafter, the protective film 175 including an adhesion layer is attached to the antistatic layer 160.

Figure 13:
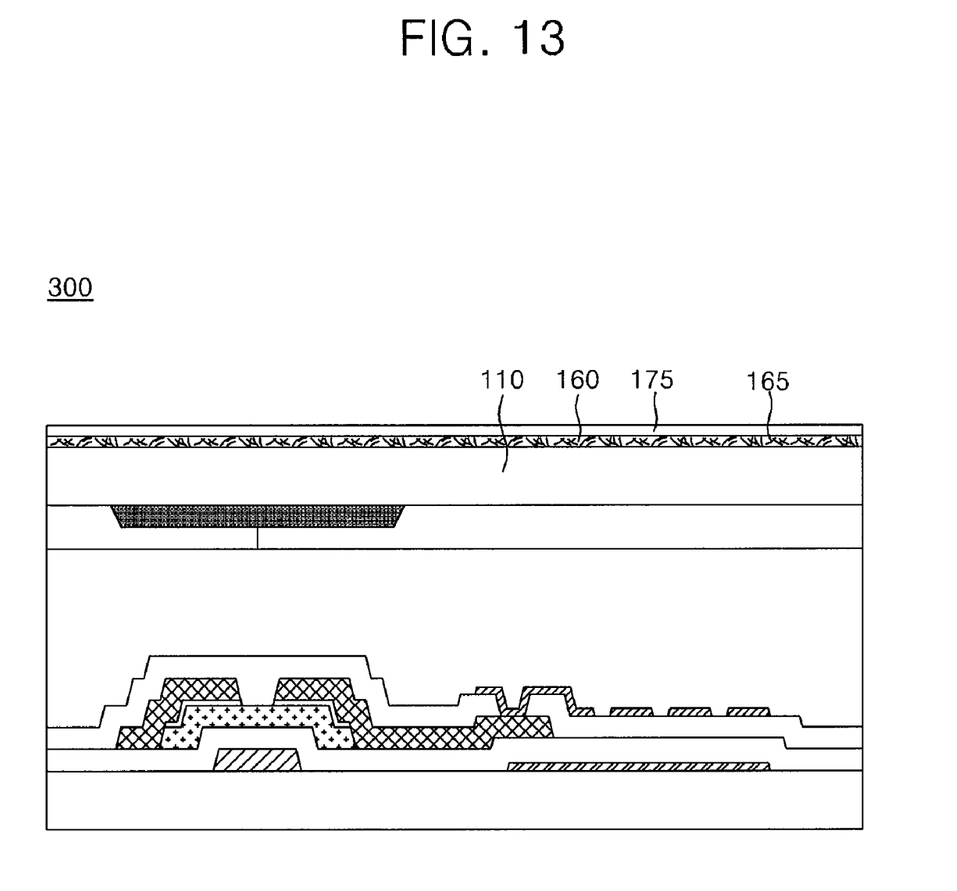
FIG. 13 is a cross-sectional view of still another exemplary embodiment of a process of manufacturing the antistatic layer according to the present invention.

FIG. 13 is a cross-sectional view of another exemplary embodiment of a process of manufacturing an antistatic layer according to the present invention.

Referring to FIG. 13, an antistatic layer 160 and a protective film 175 are formed at the back side of a second substrate 110. The antistatic layer 160 is formed by coating an aqueous solution including a conductive nanowire 165 and a polymer material at the back side of the second substrate 110 by wet coating. Next, a protective film 175 is attached to an antistatic layer 160 to protect the antistatic layer 160 from external shock or scratching. As a result, the antistatic layer 160 and the protective film 175 are formed at the back of the second substrate 110.

Although the antistatic layer 160 has been described as being formed after the TFT substrate 100 and the opposite substrate 150 have been assembled, the present invention is not limited thereto and the antistatic layer 160 may be formed before the TFT substrate 100 and the opposite substrate 150 are assembled.

As described above, an LCD panel and a method of manufacturing the LCD panel according to the present invention can save manufacturing costs by forming the antistatic layer using a conductive nanowire. Further, an LCD panel and a method of manufacturing the LCD panel according to the present invention can protect the antistatic layer from scratching by forming an overcoat layer or a protective film on the antistatic layer, thereby reducing a defect rate of the LCD panel.

As will by now be evident to persons of skill in this art, many modifications, substitutions and variations can be made in and to the materials, components, configurations and methods of implementation of the LCD panels and methods for manufacturing them of the present invention without departing from its spirit and scope. Accordingly, the scope of the present invention should not be limited to the particular embodiments illustrated and described herein, as they are merely exemplary in nature, but rather, should be fully commensurate with that of the claims appended hereafter and their functional equivalents.

What is claimed is:

1. A liquid crystal display panel, comprising:
   a first substrate;
   a thin film transistor array comprising at least one thin film transistor formed on a first surface of the first substrate;
   a second substrate comprising a first surface facing the first substrate, the second substrate comprising an antistatic layer on a surface opposite the first surface of the second substrate;
   liquid crystal molecules positioned between the first surface of the first substrate and the first surface of the second substrate; and
   an overcoat layer formed on the antistatic layer,
   wherein the antistatic layer comprises conductive nanowire.

2. The liquid crystal display panel of claim 1, wherein the conductive nanowire is comprised of an electrically conductive material.

3. The liquid crystal display panel of claim 2, the electrically conductive material comprising at least one of gold (Au), silver (Ag), platinum (Pt), palladium (Pd), nickel (Ni), copper (Cu), carbon (C), aluminum (Al), tin (Sn), and titanium (Ti), or a combination of two or more of these materials.

4. The liquid crystal display panel of claim 1, wherein the overcoat layer is formed with a thickness of about 1 nm to about 10 μm.

5. The liquid crystal display panel of claim 1, wherein the overcoat layer is formed of a transparent synthetic resin.

6. The liquid crystal display panel of claim 1, wherein the antistatic layer further comprises a polymer material.

7. The liquid crystal display panel of claim 6, wherein the polymer material is an aqueous polymer material.

8. The liquid crystal display panel of claim 7, the aqueous polymer material comprising at least one of poly(3,4-etylenedioxythiophene), water-dispersive urethane and water-dispersive polyurethane.

9. The liquid crystal display panel of claim 1, further comprising a touch sensor formed between the first substrate and the second substrate.

10. A liquid crystal display panel, comprising:
    a first substrate;
    a thin film transistor array comprising at least one thin film transistor formed on a first surface of the first substrate;

a second substrate comprising a first surface facing the first substrate, the second substrate comprising an antistatic layer on a surface opposite the first surface of the second substrate;

liquid crystal molecules positioned between the first surface of the first substrate and the first surface of the second substrate; and a protective film on the antistatic layer, wherein the antistatic layer comprises conductive nanowire.

11. The liquid crystal display panel of claim 10, further comprising an adhesion layer interposed between the antistatic layer and the protective film.

* * * * *